United States Patent [19]

Denholm

[11] 4,039,278
[45] Aug. 2, 1977

[54] BAKERY OVEN

[76] Inventor: Andrew Denholm, 2 Pearce Avenue, Edinburgh, EH12 8SW, Scotland

[21] Appl. No.: 557,986

[22] Filed: Mar. 13, 1975

[30] Foreign Application Priority Data

Mar. 18, 1974 United Kingdom .............. 11956/74

[51] Int. Cl.² .............................................. F27B 9/00
[52] U.S. Cl. ................................. 432/144; 432/153; 34/196; 34/225; 126/21 A
[58] Field of Search .................... 34/195–197, 34/181, 187, 191, 225; 432/144, 145, 153, 121; 126/21 A; 219/400

[56] References Cited

U.S. PATENT DOCUMENTS

| | | | |
|---|---|---|---|
| 1,504,854 | 8/1924 | Baker | 34/194 |
| 1,559,416 | 10/1925 | Gantvoort | 432/144 |
| 1,568,436 | 1/1926 | Anderson | 34/194 |
| 1,881,063 | 10/1932 | Randolph | 34/194 |
| 2,382,084 | 8/1945 | Mathews | 34/196 |
| 3,261,650 | 7/1966 | Stromqvist | 34/196 |
| 3,526,752 | 9/1970 | Bell | 219/400 |
| 3,548,514 | 12/1970 | Smith et al. | 432/144 |
| 3,668,817 | 6/1972 | Bell | 219/388 |
| 3,719,180 | 3/1973 | Pere | 126/21 A |
| 3,720,003 | 3/1973 | Huthmann | 34/225 |
| 3,727,324 | 4/1973 | Melgaard | 34/225 |
| 3,813,216 | 5/1974 | Baur et al. | 432/145 |

FOREIGN PATENT DOCUMENTS

| | | | |
|---|---|---|---|
| 112,359 | 2/1929 | Austria | 34/197 |
| 2,094,630 | 1/1972 | France | 126/21 A |

Primary Examiner—John J. Camby
Assistant Examiner—Henry C. Yuen
Attorney, Agent, or Firm—Fleit & Jacobson

[57] ABSTRACT

A tunnel oven for bakery purposes has a plurality of horizontally- and vertically-spaced hot air supply orifices in each of its vertical walls. At least some and preferably all such orifices are individually adjustable slots. Each wall also has air extraction orifices connected to suitable ducting.

8 Claims, 4 Drawing Figures

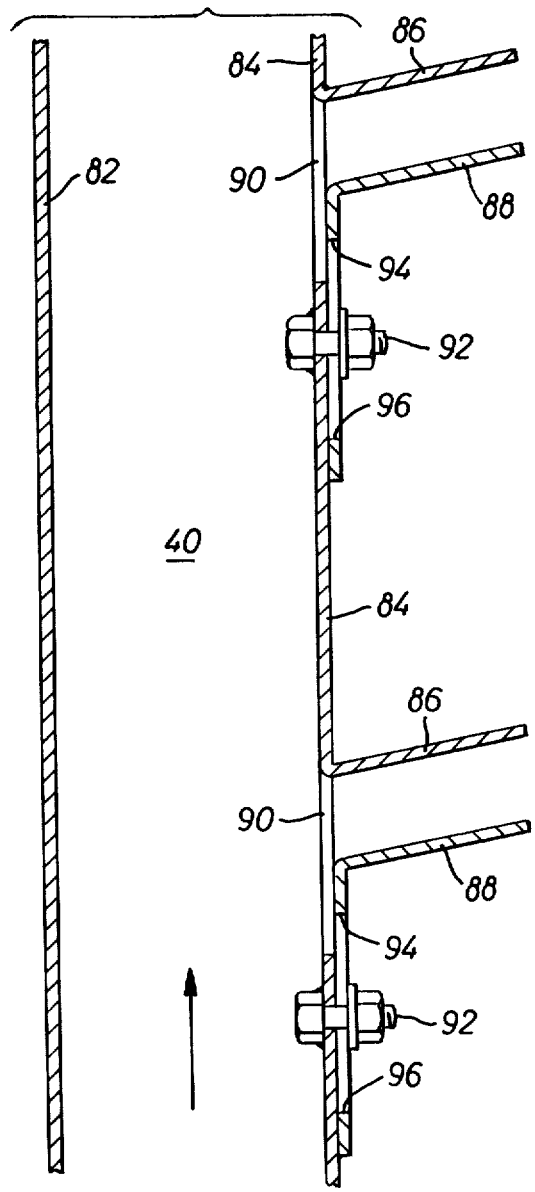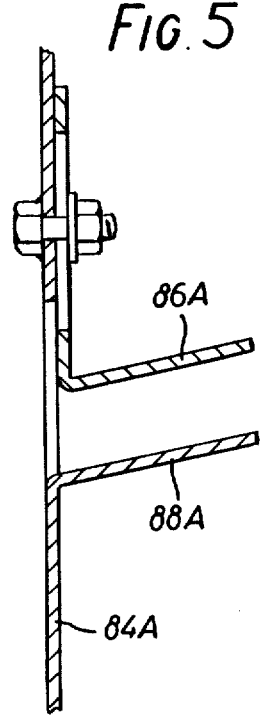

BAKERY OVEN

BACKGROUND OF THE INVENTION

This invention relates to an oven.

Prior designs of ovens such as the static flat deck, rotating reel and conventional band or grid travelling oven are wasteful in their use of floorspace.

The applicant's previous design known as the ROTORACK drastically reduced the amount of floor space required for a given output. In the Rotorack, items to be baked are placed on shelves on mobile racks and wheeled into the oven. In the oven the racks are rotated slowly on a common turntable and the air is passed horizontally across the oven in a controlled fashion to give even baking throughout the oven. These are manufactured up to 8 racks capacity. The present invention has been designed bearing in mind the need to limit the capital cost and limit the floorspace needed, while still providing a bakery oven of high quality production capacity. The present invention is capable of a much higher volume of production than previous designs and has the ability to afford possibilities for automated loading and unloading of the oven.

SUMMARY OF THE INVENTION

In accordance with the invention in its broadest aspect, there is provided a tunnel oven having vertically and longitudinally spaced hot air supply orifices in a longitudinal wall thereof.

In accordance with the invention in a narrower aspect, there is provided a bakery oven which comprises a chamber defined by a pair of generally vertical walls, a roof, and a floor, and having an entry aperture at or near one end and an exit aperture at or near the other end, in which hot air supply orifices are arranged in horizontally-spaced or vertically-spaced groups along at least one and preferably along both of the walls and in which each group of orifices includes a plurality of orifices vertically-shaped or horizontally-spaced from one another and includes means whereby the cross-sectional area of at least some of the orifices can be varied.

PREFERRED EMBODIMENT OF THE INVENTION

In a preferred form of the invention, the hot air supply orifices are arranged in both vertical walls. At least some and preferably all of such orifices are adjustable in cross-sectional area. This facilitates setting up the oven to provide any desired heating pattern and assists in achieving uniformity of heating throughout the oven. A particularly preferred embodiment of the invention includes air extraction orifices disposed in the vertical walls and interspersed among the air supply orifices.

At least some and preferbly most or all of the air supply orifices are horizontal slots partly-defined by a upper and lower louvre members, one or both of such members being adjustable in a vertical direction to vary the orifice cross-sectional area. Either the upper or the lower louvre member, or both, may have a horizontal plate or flange extending into the oven chamber. This assists in guiding inflowing air in a horizontal direction, which is desirable from the point of view of good heat distribution to the products being baked.

BRIEF DESCRIPTION OF THE DRAWINGS

The invention will be better understood from the following description of an illustrative embodiment, given with reference to the accompanying drawings, in which:

FIG. 4 is a vertical cross-sectional view of the orifices.

FIG. 5 is a vertical cross-sectional view of an alternative orifices embodiment.

DETAILED DESCRIPTION OF THE INVENTION

Figure 1:
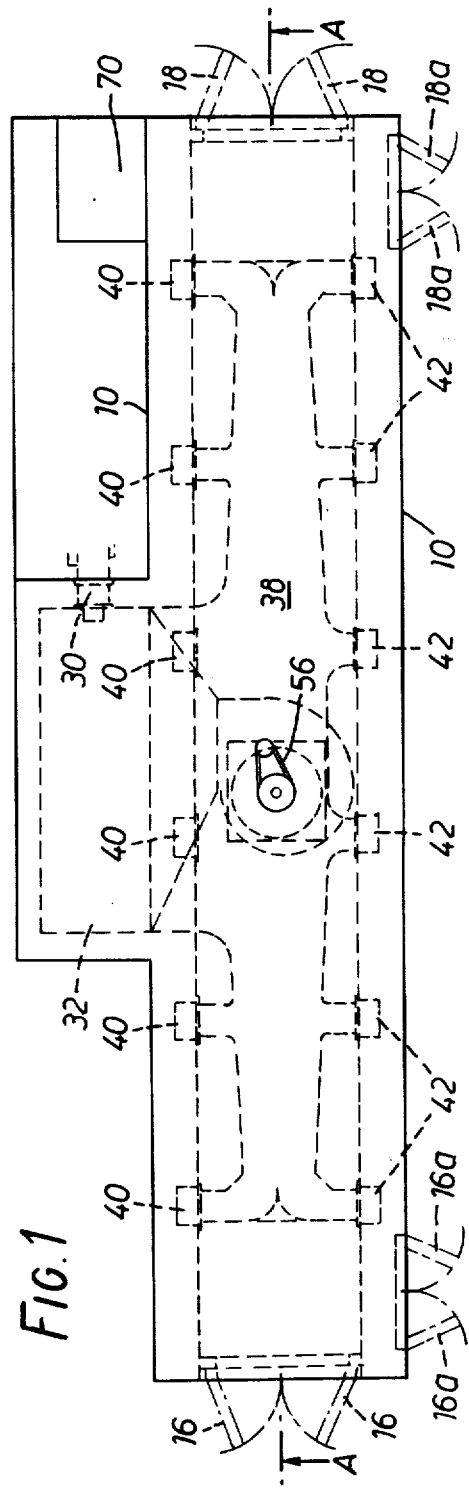
FIG. 1 is a plan view of one example of oven in accordance with the invention.

The illustrated oven comprises a chamber defined by a pair of generally vertical walls 10, a roof 12 and a floor 14. The oven is of tunnel shape and has an entry aperture closed by entry doors 16 and an exit aperture closed by exit doors 18. An alternative position for the entry doors is shown at 16a and an alternative position for the exit doors is shown at 18a in FIG. 1.

Over a major part cf the length of the oven, the floor is formed by an endless conveyor 20, passing round sprockets or rollers 22, one or both of which can be driven by a suitable motor, not illustrated. The conveyor 20 may be a belt conveyor or a conveyor made up of plates or links pivotally connected together.

Figure 3:
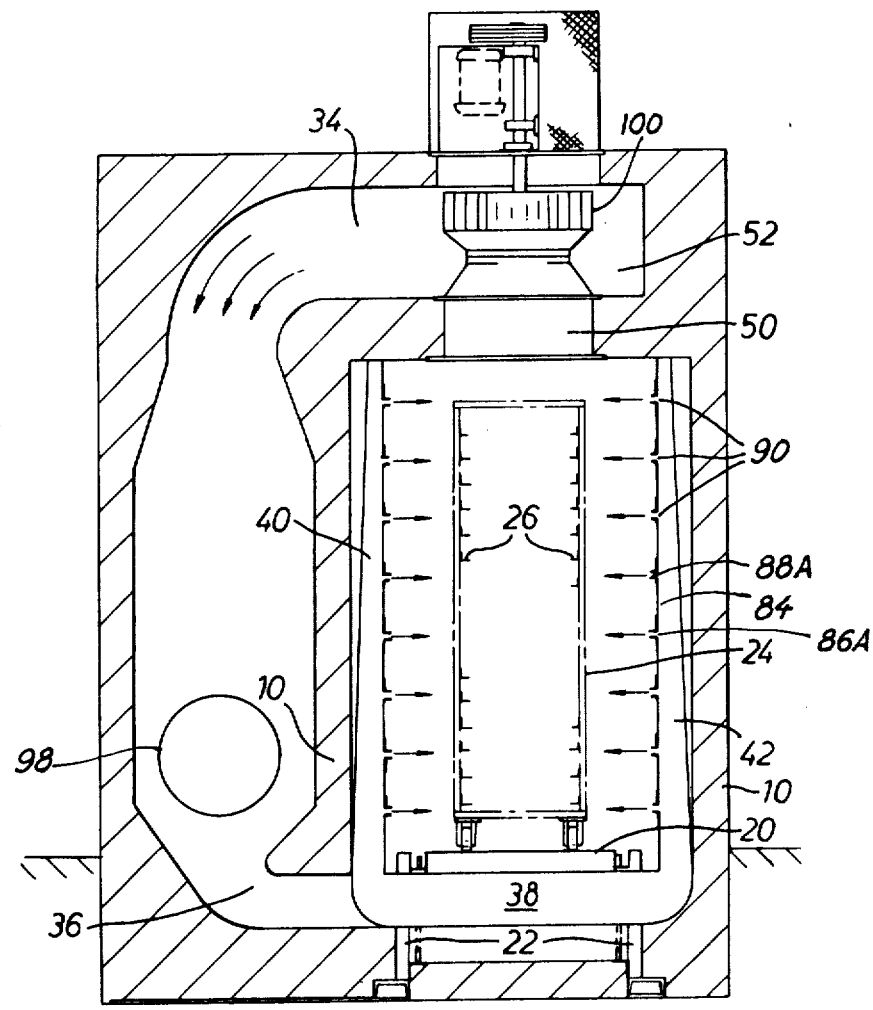
FIG. 3 is a vertical cross-section, laterally of the oven on the line B—B of FIG. 2.

In use, wheeled racks, one of which is shown at 24 in FIG. 3, are pushed into the tunnel oven through the doors 16 and are conveyed through the oven by the conveyor 20. These racks have flanges 26 which support trays carrying articles to be baked. In this way, a high capacity can be achieved with minimum handling of the product.

Heating within the oven is effected by circulation of hot air. The air is heated by a burner 30, see FIG. 1, which heats a chamber 32. This chamber contains a heat exchanger 98 in which air to be heated passes over the exchanger from a first duct 34 (FIG. 3) to a second duct 36. The hot air passes from the duct 36 to an under-floor duct 38, and this communicates with vertically rising ducts 40, 42 arranged in pairs with one member of each pair in each vertical wall of the oven. As can be seen from FIG. 3, the ducts 40, 42 decrease in cross-sectional area as they rise, in order to maintain the delivery pressure at the uppermost air supply orifices.

Alternatively the baking air can be directly reheated without the requirement of a heat exchanger by mixing it with the combustion gases and recirculating baking air in a common chamber.

Where necessary to suit site conditions, duct 36 can be turned to a vertical position to deliver air to a duct which would be resited over the top of the tunnel. The latter duct would connect with vertical ducts 40 and 42 tapering towards the floor. In this construction, the ducts 38, 40 and 42 would be inverted compared to that shown on FIG. 3.

A plurality of hot air supply orifices 90 are arranged in horizontally spaced groups along the walls of the oven, the orifices of each group being connected to one or other of the ducts 40, 42. As illustrated, such orifices are provided in both longitudinal walls of the oven but of course in a modification such orifices could be provided in only one longitudinal wall.

As illustrated, the orifices 90 are formed by horizontal slots, and these horizontal slots are defined by a series of vertically spaced L shaped plates, the longer limb of the L 84 and 84A forming part of the wall of the duct and the shorter limb of the L 86 and 88A serving as a flange extending horizontally into the oven to assist in directing air flow in a horizontal direction. The other edge of each orifice 90 is defined by a second flange 88, 86A on a further L shaped plate whose position is vertically adjustable in relation to the first mentioned L shaped plate. In this way, the vertical height of the horizontal slot can be varied, and any desired setting can be arrived at, within the limits of movement of the second L-shaped plate, for each of the horizontal slots in a group. FIG. 4 shows the lower L-shaped plate 88 slidable in a conventional manner by means of a vertical slot whose upper boundary is indicated at 94 and whose lower boundary is indicated at 96 in an adjustable bolt 92. FIG. 5 shows a similar well-known arrangement whereby the top L-shaped plate 86A is adjustable. In this way, the flow of hot air can firstly be directed generally horizontally and normally across the oven as it enters, and secondly the quantity of hot air introduced at different points along the length of the oven and at different points throughout the vertical height of the oven can be adjusted as desired in order to obtain the desired baking effect.

Alternatively hot air may be introduced into the oven through orifices placed on ducts 40 and 42 in horizontal or vertical patterns with adjustment to control the volume of air introduced to the oven, substantially uniformly over the height of the oven.

A drive unit for the conveyor 20, for example an electric or hydraulic motor, is shown at 70 in FIG. 1.

Hot air so supplied is removed by extraction orifices and extraction ducts. These extraction orifices and ducts may be disposed whereever convenient in the walls, roof, or floor of the oven, but as illustrated they are disposed in the roof. The extraction orifices are shown at 50, and lead either directly into a fan chamber 52 or into this chamber via extraction ducts 54. The fan is driven via a bolt drive 56 from a motor 58, and its output side is connected directly to the duct 34. In this way, it will be seen that the fan sucks air from the oven chamber and delivers it to the heat exchanger where it is re-heated and then later fed into the oven chamber via duct 36.

Figure 2:
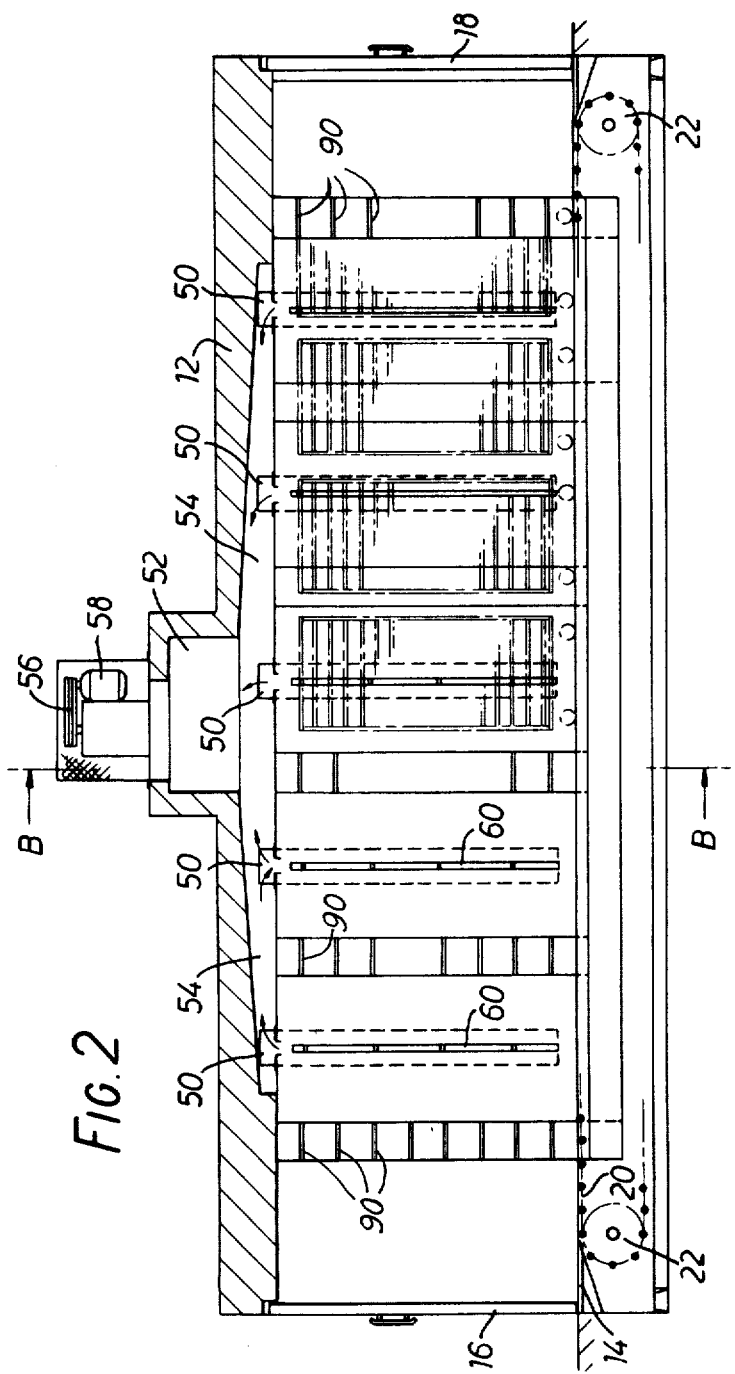
FIG. 2 is a vertical section on the line A—A of FIG. 1.

Although in the previous description air extraction ducts located in the roof have been described, an alternative or additional feature is that air extraction ducts can be provided as vertical slots in the walls, each such slot being connected with a duct behind the wall that connects to a roof extraction duct such as duct 54 in FIG. 2. In FIG. 2, the air extraction slots are shown at 16. It will be appreciated that other methods of air extraction and other air extraction devices can be used as will occur to one skilled in the art.

Alternatively to suit site conditions duct 54 can be placed on either side of the oven or under the floor.

The invention specifically described and illustrated herein has the advantage that a high capacity oven can be constructed with relatively low capital cost and with the utilisation of a reduced amount of floor space, compared to prior art ovens. In addition, a good uniformity of heating effect can be achieved by the hot air supply arrangements particularly disclosed.

The oven may be used for any industrial use and is not limited to bakery applications.

I claim:

1. A bakery oven which comprises a chamber defined by a pair of generally vertical walls, a roof, and a floor which define an entry aperture at or near one end and an exit at or near the other end, at least one of the walls having means which define a plurality of hot air supply orifices, the orifices being arranged in horizontally-spaced and vertically-spaced groups and each group of orifices includes a plurality of orifices vertically or horizontally-spaced from one another, wherein said orifices are horizontal slots formed by upper and lower louver members each louver member having a horizontal plate or flange extending into the chamber wherein inflowing air is guided in operation of the oven to travel substantially horizontally, and a selected one of the louver members of each pair of upper and lower louver members is slidable towards and away from the other louver member to allow adjustment of the width of the slot defined thereby, air supply ducts in at least one of said walls, comprising a first duct, an intermediate duct connected with said first duct, a heat exchanger positioned within said intermediate duct having an outlet, said exchanger outlet connected to a second duct whereby hot air is conveyed from the heat exchanger to the hot air supply orifices, said air supply ducts further comprise an under-floor duct and a vertical duct which includes two air duct branches, said under-floor duct being disposed under the floor and connecting with said vertical duct, one said air duct branch extending upwardly in one of said walls and the other said air duct branch extending upwardly in the other of said walls.

2. An oven according to claim 1 in which the chamber is elongated and is in the form of a straight tunnel.

3. An oven according to claim 1 in which the floor of the chamber is formed by a conveyor.

4. An oven according to claim 3, wherein said conveyor comprises a floor drag conveyor.

5. An oven according to claim 3 wherein said conveyor comprises means for carrying wheeled racks.

6. An oven according to claim 1 in which air extraction orifices are provided in the roof.

7. An oven according to claim 1 in which air extraction orifices are provided by slots extending substantially the whole of the vertical height of the oven.

8. A bakery oven which comprises a chamber defined by a pair of generally vertical walls, a roof, and a floor which define an entry aperture at or near one end and an exit at or near the other end, at least one of the walls having means which define a plurality of hot air supply orifices, the orifices being arranged in horizontally-spaced and vertically-spaced groups and each group of orifices includes a plurality of orifices vertically or horizontally-spaced from one another, wherein said orifices are horizontal slots formed by upper and lower louver members each louver member having a horizontal plate or flange extending into the chamber whereby inflowing air is guided in operation of the oven to travel substantially horizontally, and a selected one of the louver members of each pair of upper and lower louver members is slidable towards and away from the other louver member to allow adjustment of the width of the slot defined thereby, air supply ducts in at least one of said walls, comprising a first duct, an intermediate duct connected with said first duct, a heat exchanger positioned within said intermediate duct having an outlet, said exchanger outlet connected to a second duct whereby hot air is conveyed from the heat exchanger to the hot air supply orifices, said air supply ducts each have a roof duct and a vertical duct which includes at least two air duct branches, said roof duct being disposed in the roof and connecting with said vertical duct, one said air duct branch extending downwardly in one of said walls and the other said air duct branch extending downwardly in the other of said walls.

* * * * *